US007656391B2

(12) United States Patent
Kimura et al.

(10) Patent No.: US 7,656,391 B2
(45) Date of Patent: *Feb. 2, 2010

(54) TOUCH PANEL, DISPLAY DEVICE PROVIDED WITH TOUCH PANEL AND ELECTRONIC EQUIPMENT PROVIDED WITH DISPLAY DEVICE

(75) Inventors: Hajime Kimura, Kanagawa (JP); Jun Koyama, Kanagawa (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 686 days.

This patent is subject to a terminal disclaimer.

(21) Appl. No.: 11/274,269

(22) Filed: Nov. 16, 2005

(65) Prior Publication Data

US 2006/0066537 A1    Mar. 30, 2006

Related U.S. Application Data

(62) Division of application No. 09/406,795, filed on Sep. 28, 1999, now Pat. No. 6,972,753.

(30) Foreign Application Priority Data

Oct. 2, 1998    (JP)    ................................. 10-281507

(51) Int. Cl.
*G09G 5/00*    (2006.01)
(52) U.S. Cl. .......................... 345/173; 345/76; 345/102; 178/18.09; 178/19.05; 178/18.01
(58) Field of Classification Search ......... 345/173–175, 345/102; 178/18.09, 19.05, 18.01
See application file for complete search history.

(56) References Cited

U.S. PATENT DOCUMENTS

| 3,673,327 | A | * | 6/1972 | Johnson et al. | .......... 178/18.04 |
| 4,305,071 | A | * | 12/1981 | Bell et al. | .................... 345/176 |
| 4,320,292 | A | * | 3/1982 | Oikawa et al. | ......... 250/227.11 |
| 4,542,375 | A | * | 9/1985 | Alles et al. | .................. 345/176 |
| 4,673,918 | A | * | 6/1987 | Adler et al. | .................... 341/13 |
| 4,710,759 | A | * | 12/1987 | Fitzgibbon | .................. 345/175 |

(Continued)

FOREIGN PATENT DOCUMENTS

JP    03-067319    3/1991

(Continued)

*Primary Examiner*—Sumati Lefkowitz
*Assistant Examiner*—Grant D Sitta
(74) *Attorney, Agent, or Firm*—Eric J. Robinson; Robinson Intellectual Property Law Office, P.C.

(57) ABSTRACT

A touch panel using an optical sensor has a simple construction and can accurately detect an input position. An illuminating lights emitted from illuminating means are turned into lights having a high directivity in an X-axis direction and in a Y-axis direction of the prism lens sheet and thereafter enter from side faces of a light guide panel as incident lights. The incident lights advance in the inside of the light guide panel toward opposite side faces while being subjected to a total reflection and are received by the optical sensor arrays. When an input pen or a fingertip touches a surface of the light guide panel, the lights are refracted or absorbed at a touched position and hence, a quantity of received lights at the optical sensor arrays is reduced.

47 Claims, 8 Drawing Sheets

U.S. PATENT DOCUMENTS

| | | | |
|---|---|---|---|
| 4,737,626 A * | 4/1988 | Hasegawa | 250/221 |
| 4,737,631 A * | 4/1988 | Sasaki et al. | 250/221 |
| 4,766,424 A * | 8/1988 | Adler et al. | 345/175 |
| 4,872,000 A * | 10/1989 | Kano et al. | 345/180 |
| 4,963,859 A * | 10/1990 | Parks | 345/176 |
| 5,196,836 A * | 3/1993 | Williams | 345/175 |
| 5,220,409 A * | 6/1993 | Bures | 356/621 |
| 5,598,280 A * | 1/1997 | Nishio et al. | 349/57 |
| 5,748,228 A | 5/1998 | Kobayashi et al. | |
| 5,764,223 A * | 6/1998 | Chang et al. | 345/175 |
| 5,771,039 A * | 6/1998 | Ditzik | 345/178 |
| 5,981,938 A * | 11/1999 | Benoliel | 250/216 |
| 6,008,798 A | 12/1999 | Mato, Jr. et al. | |
| 6,011,602 A | 1/2000 | Miyashita et al. | |
| 6,031,511 A * | 2/2000 | DeLuca et al. | 345/84 |
| 6,172,667 B1 * | 1/2001 | Sayag | 345/175 |
| 6,219,116 B1 | 4/2001 | Yuuki et al. | |
| 6,269,565 B1 * | 8/2001 | Inbar et al. | 40/361 |
| 6,456,279 B1 | 9/2002 | Kubo et al. | |
| 6,597,348 B1 * | 7/2003 | Yamazaki et al. | 345/175 |
| 6,661,542 B1 * | 12/2003 | Mangerson | 358/484 |
| 6,972,753 B1 * | 12/2005 | Kimura et al. | 345/175 |

FOREIGN PATENT DOCUMENTS

| | | |
|---|---|---|
| JP | 05-080935 | 4/1993 |
| JP | 7-020985 | 1/1995 |
| JP | 7-152473 | 6/1995 |
| JP | 7-253853 | 10/1995 |
| JP | 10-027067 | 1/1998 |
| JP | 10-091348 | 4/1998 |
| JP | 11-119912 | 4/1999 |
| JP | 2002-259347 | 9/2002 |

* cited by examiner

TOUCH PANEL, DISPLAY DEVICE PROVIDED WITH TOUCH PANEL AND ELECTRONIC EQUIPMENT PROVIDED WITH DISPLAY DEVICE

BACKGROUND OF THE INVENTION

1. Field of the Invention

This invention relates to a touch panel which detects an input position inputted by a nib of a pen or a fingertip by means of optical sensors and an electronic equipment provided with such a touch panel.

2. Description of the Related Art

Conventionally, a touch panel is provided with pressure sensitive type sensors or electrostatic capacity type sensors on an entire panel surface and when the panel surface is touched with the nib or the fingertip, the sensors detect the position of the nib or the fingertip. Such a touch panel, however, requires mounting of sensors on the entire panel surface so that manufacturing of the touch panel is difficult and there also exists a problem in terms of its mechanical strength.

As a touch panel which can solve the above-mentioned problems, an optical type (or a photoconductive type) touch panel which disposes light emitting elements and light receiving elements on the periphery of a panel in an opposed manner is known. FIGS. 8A and 8B show such an optical type touch panel schematically. FIG. 8A is a top view and FIG. 8B is a cross-sectional view taken along a dashed line A-A' of FIG. 8A.

As shown in FIGS. 8A and 8B, the light emitting elements 12a, 12b, 12c, 12d and 12e are arranged in line on one side of the panel 11 and the light receiving elements 13a, 13b, 13c, 13d and 13e are arranged in line on an opposing side of the panel 11. When the finger touches the panel 11, a light emitted from the light emitting element 12b is interrupted at a touched position and hence, an output signal of the light receiving element 13b opposing to the light emitting element 12b is reduced. That is, the finger touched position is detected as a position of the light receiving element of which the output signal has been reduced.

With respect to such an optical type touch panel shown in FIGS. 8A and 8B, however, the light propagates in air so that the light is liable to receive an outdoor daytime light. Furthermore, there is a drawback that the surfaces of the light emitting members 12a, 12b, 12c, 12d and 12e and the light receiving members 13a, 13b, 13c, 13d and 13e easily get dirty. One of touch panels in which this defect have been improved is disclosed in Japanese Patent Laid-Open No. 7-253853. An entire disclosure of the Japanese Patent Laid-Open No. 7-253853 is incorporated herein by reference.

As shown in FIG. 9, in the Japanese Patent Laid-Open No. 7-253853, light emitting elements 22 are arranged in line on a side face of a deformable panel 21 including anisotropic transparent crystal and light receiving elements 23 are arranged in line on a side face opposing to the above-mentioned side face. Since the light emitting elements 22 and the light receiving elements 23 are mounted in close contact with the side faces of the panel 21, the panel hardly receives the influence of stain.

An emitted light from the light emitting element 22 advances toward the light receiving element 23 along an optical path P. When the panel 21 is pushed by a finger, a pushed portion is distorted and the emitted light from the light emitting element 22 advances along an optical path Q so that the emitted light is not received by the light receiving element 23. In this manner, a position of a portion which the finger touched can be detected. In such a touch panel, since the emitted light from the light emitting element advances in the inside of the panel and hence, it receives no influence of an outdoor daytime light.

With respect to the touch panel described in the Japanese Patent Laid-Open No. 7-253853 shown in FIG. 9, however, since the panel 21 is deformed, when the panel 21 is mounted on the upper surface of a liquid crystal panel, the influence caused by the deformation of the panel 21 is transferred to the liquid crystal panel and affects the maintenance of cell gaps.

Furthermore, although the emitted light from the light emitting element 22 is reflected and guided to the outside of the panel by making use of the deformation of the panel 21, depending on the degree of deformation of the panel 21, that is, depending on the radius of curvature of a deformed portion, there is a case that the light advancing along the optical path P cannot be reflected to the outside of the panel 21 and the light is scattered in the inside of the panel 21. When such scattering of light occurs, a finger touched position cannot be accurately detected.

SUMMARY OF THE INVENTION

It is an object of this invention to provide a touch panel of a type capable of detecting a position using an optical sensor which can overcome the above drawback and exhibits a high resistance against outdoor daytime light, contamination and mechanical impact and can accurately detect the position.

To overcome the above-mentioned problems, the touch panel of this invention is characterized by including a light guide panel made of translucent material, an optical sensor array having a light receiving face thereof opposed to a side face of the light guide panel, a lens sheet having a light emitting face thereof opposed to a side face of the optical sensor array which opposes the side face of the light guide panel, and illumination means for illuminating an incident light face of the lens sheet.

This invention is also characterized in that a refractive index of the translucent material which forms the light guide panel is set to from 1.4 to 1.7.

This is because that in case the refractive index is close to $2^{1/2}$, even when an incident angle of an incident light which enters from the side surface of the light guide panel is 90°, the incident light can be refracted at the side face of the light guide panel. That is, the incident light to the side face of the light guide plate can be refracted irrespective of the incident angle to the side face of the light guide panel so that the light can be efficiently led to the inside of the light guide panel. Furthermore, the light led to the inside of the light guide panel is subjected to a total reflection between a front surface (top surface) and a back surface (bottom surface) of the light guide panel.

Due to such a construction, the illuminating light emitted from illumination means is turned into a light having a high directivity by a lens sheet and thereafter enters the light guide panel from a side face thereof. The incident light advances toward the opposing side face in the inside of the light guide panel while being subjected to the total reflection and is received by the optical sensor array. When an input pen or a fingertip touches the front surface of the light guide panel, the light is refracted or absorbed at a touched position so that a quantity of received light by the optical sensor array is reduced. At the optical sensor array, the change of the quantity of received light is detected electrically.

BRIEF DESCRIPTION OF THE DRAWINGS

The accompanying drawings, which are incorporated in and constitute a part of this specification, illustrate one embodiment of the invention and, together with the description, serve to explain the principles of this invention.

DESCRIPTION OF THE PREFERRED EMBODIMENTS

Preferred embodiments of this invention are explained in detail in conjunction with attached drawings.

First Embodiment

The first embodiment of this invention is explained in conjunction with FIGS. 1A and 1B, FIGS. 2A and 2B, FIGS. 3A, 3B and 3C.

Figure 1A:
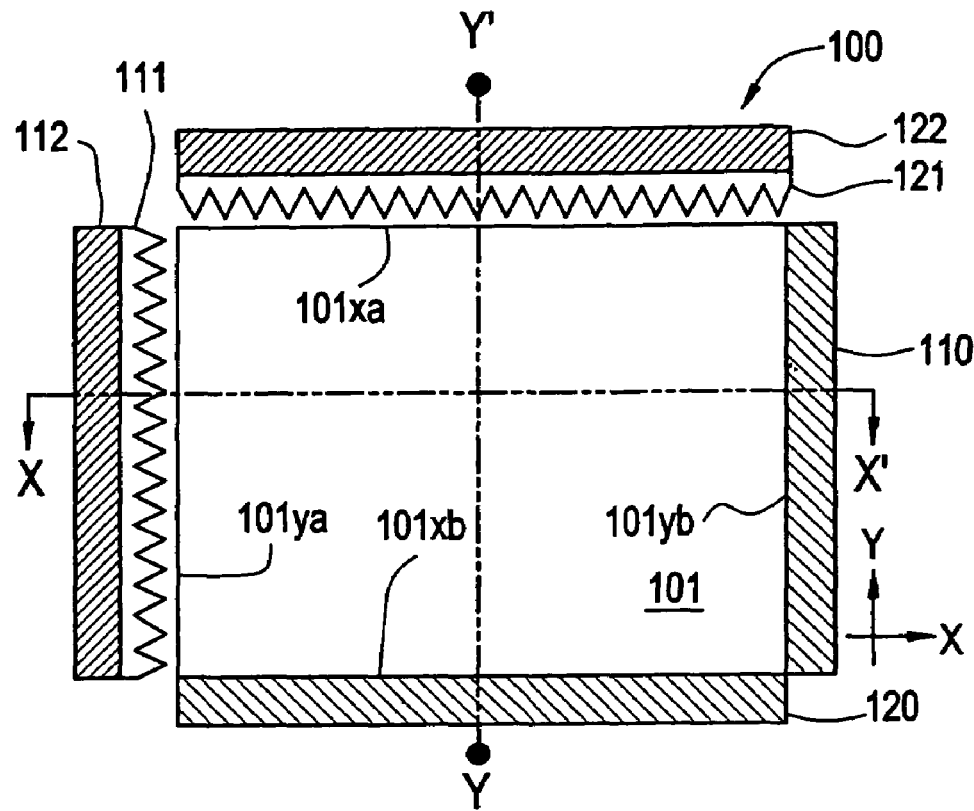
FIGS. 1A and 1B include a top view and a cross-sectional view of a touch panel of this invention.
Figure 1B:
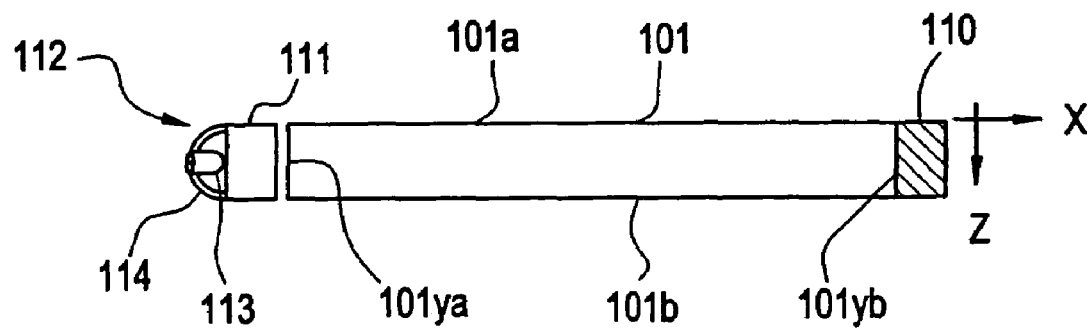

FIGS. 1A and 1B show the construction of a touch panel of this invention. FIG. 1A is a top view and FIG. 1B is a cross-sectional view of FIG. 1A taken along a dotted line X-X'. In the touch panel 100 of this invention, a panel surface thereof is formed of a light guide panel 101 which is made of translucent material. On a side face 101$yb$ of the light guide panel 101, an optical sensor array 110 for detecting a position in a Y-axis direction (Y coordinates) is closely mounted. A prism lens sheet 111 is mounted on and along a side face 101$ya$ which opposes the side face 101$yb$ and a light emitting face of the prism lens sheet 111 opposes the side face 101$ya$. Furthermore, an illumination device 112 is provided such that the device 112 opposes to an incident light face of the prism lens sheet 111.

The cross-sectional structure of the touch panel 100 taken along a dotted line Y-Y' is as same as that of FIG. 1B. An optical sensor array 120 for detecting a position in an X-axis direction (X coordinates) is closely mounted on a side face 101$xb$ of the light guide panel 101. A prism lens sheet 121 is provided such that the sheet 121 opposes a side face 101$xa$ of the light guide panel 101 which opposes the side face 101$xb$. An illumination device 122 is provided such that the device 122 opposes an incident light face of the prism lens sheet 121.

In this invention, the light guide panel 101 is made of translucent material. The scale for translucency of the translucent material is determined such that the transmittance (or all light transmittance) to a visible light is equal to or more than 80% and preferably equal to or more than 85%. Furthermore, the refractive index of the translucent material which forms the light guide panel 101 is set to from 1.4 to 1.7.

As such translucent material, inorganic glass such as quartz glass or borosilicate glass (refractive index 1.42-1.7, transmittance 90-91%) and resin material (plastic) can be used. As plastic, methacrylic resin (more specifically, polymethyl methacrylate (refractive index 1.49, transmittance 92-93%)), polycarbonate (refractive index 1.59, transmittance 87-90%), polystyrene (refractive index 1.59, transmittance 88-90%), polyarylate (refractive index 1.61, transmittance 80%), poly-4-methylpentene-1 (refractive index 1.46, transmittance 90%), AS resin (acrylonitrile stylene copolymer) (refractive index 1.57, transmittance 90%), MS resin (methyl methacrylate stylene copolymer) (refractive index 1.56, transmittance 90%) and the like can be used. Translucent material in which these resin material are mixed can be also used.

In this invention, the refractive index is a refractive index in air using a D line (589.3 nm) of sodium. More specifically, the refractive index and the transmittance of plastic are defined as values measured based on the refractive index measuring method and the all light transmittance measuring method prescribed in JIS K7105.

The thickness of the light guide panel 101 is set to from 0.1 to 10 mm, and preferably from 3 to 7 mm. This is because that when the light guide panel 101 is too thin, it is difficult to make light enter from the side faces 101$xa$, 101$ya$ of the light guide panel 101 and hence, the light utilization efficiency of the illumination devices 112, 122 is deteriorated, while when the light guide panel 101 is too thick, the light which enters from the front surface 101$a$ and the back surface 101$b$ are diffused in the light guide panel 101 and hence, the accuracy of position detection is deteriorated.

Figure 3A:
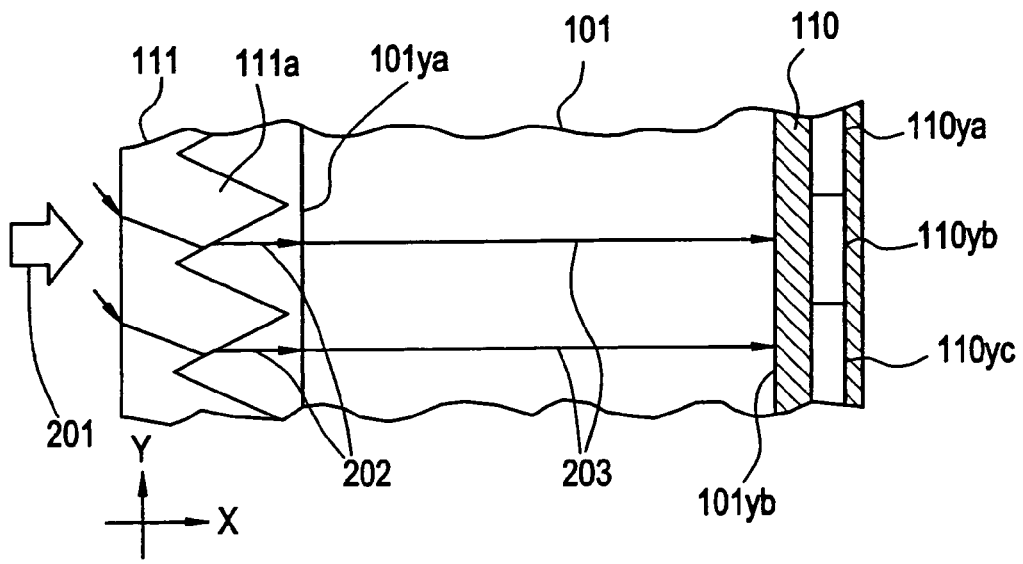
FIGS. 3A, 3B and 3C are explanatory views showing operations of the touch panel of this invention.

The prism lens sheets 111, 121 are means for enhancing the directivity of illuminating light from the illumination devices 112, 122 and the prism lens sheets 111, 121 can be made of the same translucent material as the above-mentioned light guide panel 101. As shown in FIG. 3A, at the light emitting side of the prism lens sheet 111, triangular pole shaped (triangular prism shaped) protrusions 111$a$ are contiguously formed. The prism lens sheet 121 has the same construction as that of the prism lens sheet 111 has.

As shown in FIG. 1B, the illumination device 112 includes a light source 113 and a reflection sheet 114. To effectively make use of emitted light from the light source 113, the sides of the light source 113 other than the light emitting side are covered with the reflection sheet 114. As the light source 113, a fluorescent tube or a light emitting diode (LED) which has been used as a back light of a liquid crystal panel can be used. Here, for the purpose of power saving, the LED lamps which are arranged in line are used as the light source 113. The illumination device 122 has the same construction as that of the illumination device 112 has.

At the optical sensor arrays 110, 120, optical sensors which make use of a photovoltage effect or a photoconductivity effect are arranged in an array (in line). The optical sensor arrays 110, 120 may be formed by arranging optical sensor elements such as photodiodes, phototransistors, CdS cells, CdSe cells or the like in an array or by one dimensional image sensors, for example, CCD (Charge Coupled Device), BBD (Bucket Bridge Device), CID (Charge Injection Device), CPD (Charge Priming Device), MOS type image sensors or the like.

To prevent the influence of contamination and an outdoor daytime light, the optical sensor arrays 110, 120 are hermetically adhered to the side faces 101$xb$, 101$yb$ of the light guide panel 101. To lead light into the optical sensor arrays 110, 120 assuredly, gaps defined between the light guide panel 101 and the light receiving elements or the light receiving pixel of the optical sensor arrays 110, 120 are filled with translucent resin having a higher refractive index than that of the light guide panel 101.

Figure 2A:
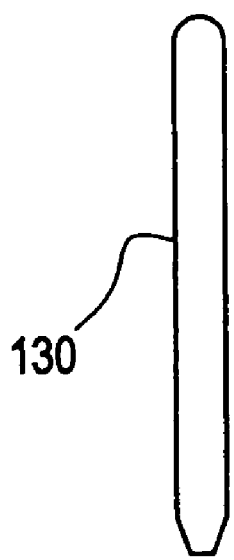
FIGS. 2A and 2B are explanatory views of input pens.

Furthermore, as shown in FIG. 2A, the touch panel sensor of this invention is provided with an input pen 130. A distal end portion of the input pen 130 which is brought into contact with the light guide panel 101 is made of translucent material and its refractive index is set to equal to or more than the refractive index of the light guide panel 101. Here, to make the manufacturing method simple, the entire body of the input pen 130 is made of translucent material having a refractive index higher than that of the light guide panel 101 and so that the entire body of the pen forms a light guide portion.

As the translucent material for forming the distal end of the input pen 130, any material which is described previously as material for forming the light guide panel 101 can be used suitably. For example, the light guide panel 101 may be formed of polymethyl methacrylate (refractive index 1.49), while the input pen 130 may be formed of polycarbonate (refractive index 1.59).

To facilitate a close contact of a nib of the input pen 130 to the front surface 101a of the light guide panel 101, the distal end of the input pen 130 preferably has a suitable resilience and is preferably made of resin material rather than glass.

Figure 3B:
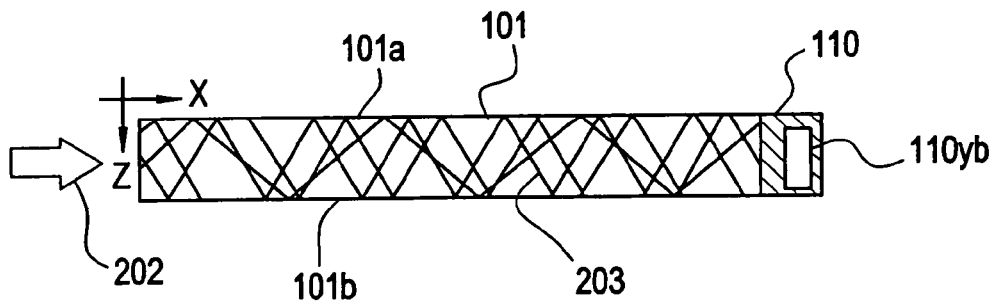
Figure 3C:
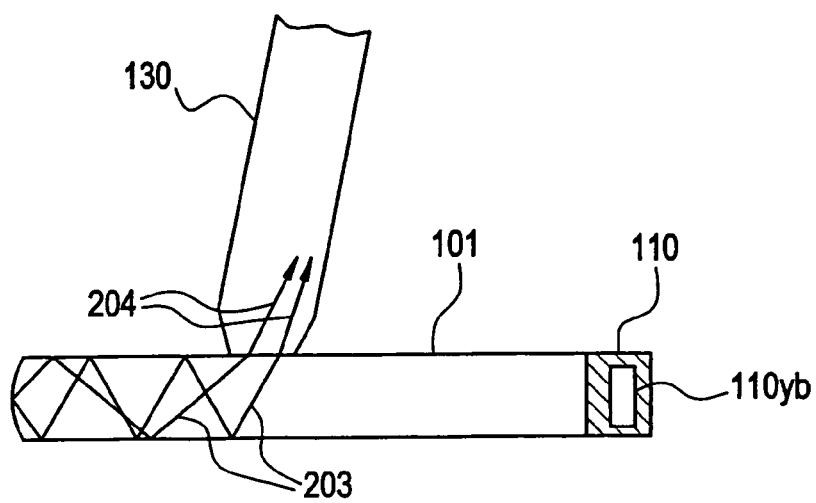

The manner of operation of the touch sensor according to this invention is hereinafter explained in conjunction with FIGS. 3A, 3B and 3C. FIG. 3A is a partial top view of a panel, FIGS. 3B, 3C are cross-sectional views. In FIG. 3A, numerals 110ya, 110yb and 110yc indicate unit sensors of the optical sensor array 110 and each one respectively corresponds to one picture element of one photodiode element or one pixel of one dimensional sensor. The change of a quantity of received light of these unit sensors 110ya, 110yb and 110yc is electrically detected and hence, the input position in a Y-axis direction can be detected. The optical sensor array 120 has the same construction as the optical sensor array 110 has.

A light 201 emitted from the illumination device 112 illuminates a light receiving face of the prism lens sheet 111 and enters the prism lens sheet 111. In the prism lens sheet 111, due to a prism action of the protrusions 111a, the incident light is converged in a Y-axis direction and is emitted as a light 202 having a small flare angle. That is, although an incident angle of the light 201 which enters the prism sheet 111 is irregular, the light is refracted by a slanted face of the protrusion 111a and the light 202 is converged in the Y-axis direction thus enhancing the directivity in the X-axis direction. As a result, the incident light 203 to the light guide panel 101 can propagate in the inside of the light guide panel 101 along the X-axis without flaring in the Y-axis direction.

On the other hand, although light 202 is not converged in a Z-axis direction (film thickness direction of light guide panel) by the prism lens sheet 111, since the refractive index of the light guide panel 101 is 1.4 to 1.7, even when the incident angle of incident light to the side face 101ya of the light guide panel 101 is close to 90°, the light 202 is refracted by the side face 101yb and is led to the inside of the light guide panel 101.

Since the refractive index of the light guide panel 101 is higher than that of air, as shown by a solid line in FIG. 3B, the incident light 203 to the inside of the light guide panel 101 propagates from the side face 101ya to the side face 101yb while being subjected to a total reflection between the front surface 101a and the back surface 101b.

As described above, due to the prism lens sheet 111, the light 202 is not converged in the Z-axis direction (film thickness direction of the light guide panel 101). Accordingly, the incident angle of the light 202 to the light guide panel 101 becomes irregular and, as shown in FIG. 3B with a solid line, the light 203 is subjected to a total reflection with an irregular angle of reflection so that the light 203 is reflected by the entire front surface 101a of the light guide panel 101. Due to such a construction, as explained later, a phenomenon that light 203 is reflected at a specified position of the front surface 101a of the light guide panel 101 can be avoided and hence, the touched position can be accurately detected.

Furthermore, according to this invention, the light 203 is turned into a light which has a strong directivity in the X-axis direction by means of the prism lens sheet 111, the light 202 emitted from the specified protrusion 111a can be received by the specified unit sensor of the optical sensor array 110. That is, the light 202 is almost entirely received by the unit sensor which opposes to the protrusion 111a and hence, the position can be accurately detected.

Furthermore, the outdoor daytime light which enters the light guide panel 101 from the front surface 101a (back surface 101b) is emitted from the back surface 101b (front surface 101a) and the light is hardly diffused in the inside of the light guide panel 101 so that the optical sensor arrays 110, 120 receive no influence from the outdoor daytime light.

Any lens sheet is available provided that the sheet has a function to converge lights having different incident angles in one direction as in the case of the prism lens sheets 111, 121. The same effect can be obtained by using a lenticular lens sheet having protrusions formed in a semicylindrical shape.

Although the process in which the illuminating light. 201 emitted from the illumination device 112 is received by the optical sensor array 110 has been explained in view of FIGS. 3A and 3B, a process in which the illuminating light emitted from the illumination device 122 is received by the optical sensor array 120 is similar to such a process. However, the latter process differs from the former process in that the light propagation direction is in the Y-axis direction.

The illuminating light emitted from the illumination device 122 is converged in the X-axis direction by means of the prism lens sheet 121 and is turned into a light having a high directivity which advances straightly in the Y-axis direction without being converged in the Z-axis direction, and thereafter is emitted from the prism lens sheet 121. The emitted light enters from the side face 101xa of the light guide panel 101 and propagates in the inside of the light guide panel 101 while being subjected to the total reflection and is emitted from the side face 101xb and is received by the optical sensor array 120.

To input a position, as shown in FIG. 3C, an input pen 130 touches the front surface 101a of the light guide panel 101. Since the input pen 130 has a higher refractive index than the light guide panel 101 has, most of the light 203 is refracted at a spot or a position where the pen 130 touches. Since the refracted light 204 enters the inside of the input pen 130, a quantity of received light of the unit sensor 110yb of the optical sensor array 110 is reduced. The position of this unit sensor 110yb is detected as the position of the nib in the Y-axis direction (Y coordinates) of the input pen 130. Due to the similar principle, the position in the X-axis direction is also detected by the optical sensor array 120. In this manner, the two-dimensional position (X coordinates, Y coordinates) of the touched position of the input pen 130 can be detected.

As has been described heretofore, according to this invention, since the light 202 is not converged in the Z-axis direction by means of the prism lens sheet 111, the light 203 which enters the light guide panel 101 is reflected at all positions of the front surface 101a of the light guide panel 101 and hence, the position can be accurately detected.

This can be better understood when a case that the light 203 is reflected only at specified positions of the front surface 101a of the light guide panel 101 is considered. When light 202 is converged in the Z-axis direction, the incident angle to the side faces 101ya, 101xa of the light guide panel 101 becomes constant and the angle of reflection at the front surface 101a and the back surface 101b of the light guide panel 101 becomes constant so that the light 203 are reflected only at the specified positions of the front surface 101a of the light guide panel 101. Accordingly, when the input pen 130 touches the position where the light 203 is not reflected, the quantity of received light at the optical sensor array is not changed and hence, the input position cannot be detected.

According to this invention, since the light 202 emitted from the prism lens sheet 111 is not converged in the Z-axis direction, the incident angle to the side face 101ya of the light guide panel 101 becomes random. Accordingly, the light 203 can be reflected at any positions of the front surface 101a and the back surface 101b of the light guide panel 101 so that the input position can be detected assuredly.

For increasing a change or a variation of the quantity of received light at the unit sensors of the optical sensor arrays 110, 120, it is preferable to prevent the refractive light 204 which is led to the input pen 130 from entering the light guide panel 101 again. To this end, the light 203 may be led to the outside of the light guide panel 101 by making use of not only the refraction effect but also the absorption effect.

Figure 2B:
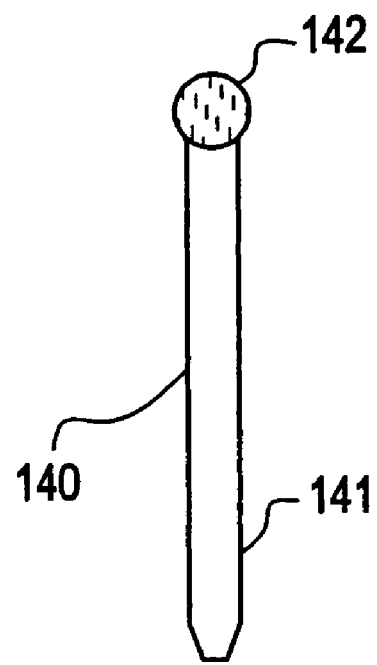

In this case, as shown in FIG. 2B, a light guide portion 141 of an input pen 140 is made of translucent material while a light absorption portion 142 is formed at a tail end portion of the input pen 140 using colored resin, wherein the light absorption portion 142 is used also as an ornament of the input pen 140. Due to the construction shown in FIG. 2B, even when the light guide portion 141 of the input pen 140 has the same refractive index as the light guide panel 101, has the light 203 can be easily led to the light guide portion 141 of the input pen 140.

According to this invention, as long as a pen shaft of the input pen including the nib is made of translucent material, the light can be led to the inside of the input pen. Unless such a function is obstructed, any ornament may be applied to the input pen suitably.

Besides the input pen made of translucent material, a fingertip or a colored nib may be used for inputting a position. In such a case, the light 203 is absorbed at a portion of the light guide panel 101 where the fingertip or the like touches and hence, the intensity of diffused light which reaches the optical sensor array can be reduced. The color to be applied to the nib may preferably be a color which exhibits the highest absorption efficiency by the wavelength of the illuminating light 201.

Second Embodiment

Figure 4A:
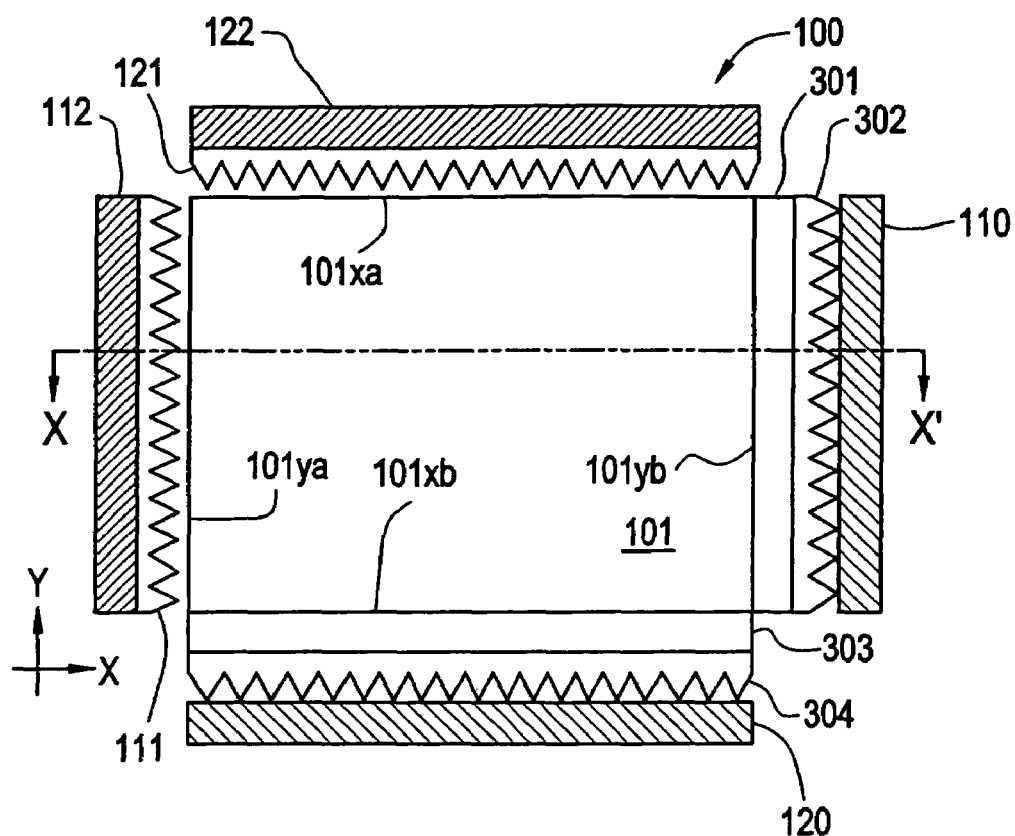
FIGS. 4A and 4B include a top view and a cross-sectional view of the touch panel of this invention.
Figure 4B:
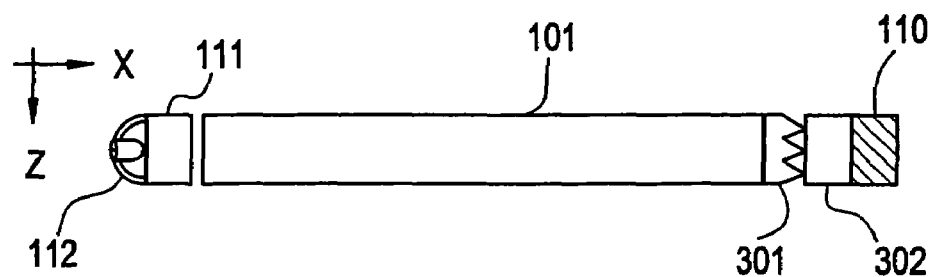

This embodiment is explained in conjunction with FIGS. 4A and 4B. Same constitutional elements used in FIGS. 1A, 1B, FIGS. 2A, 2B and FIGS. 3A, 3B, 3C are denoted by the same numerals. FIGS. 4A and 4B are composed of views showing the construction of a touch panel of this invention, wherein FIG. 4A is a top view and FIG. 4B is a cross-sectional view of FIG. 4A taken along a dotted line X-X' of FIG. 4A.

This embodiment is a modification of the first embodiment. This embodiment is characterized by an improvement that it is constructed such that a light led to a light guide panel 101 is efficiently received by optical sensor arrays 110, 120. That is, a pair of prism lens sheets 301, 302 are inserted between the light guide panel 101 and the optical sensor array 110, while a pair of prism lens sheets 303, 304 are inserted between the light guide panel 101 and the optical sensor array 120.

The prism lens sheets 301, 303 are closely mounted on the side faces 101yb, 101xb of the light guide panel 101. The prism lens sheets 301, 302 and the prism lens sheets 303, 304 have their prism faces arranged perpendicular to each other.

Due to such a construction, the light emitted from the side face 101yb of the light guide panel 101 is converged in the Z-axis direction by means of the prism lens sheet 301 and subsequently is converged in the Y-axis direction and hence, the light is efficiently received by the optical sensor array 110.

On the other hand, the light emitted from the side face 101xb of the light guide panel 101 is converged in the Z-axis direction by means of the prism lens sheet 303 and subsequently is converged in the X-axis direction by means of a prism lens sheet 304 and hence, the light is received by the optical sensor array 120.

Lights emitted from the side faces 101yb, 101xb of the light guide panel 101 are respectively converged in the Y-axis direction and the X-axis direction by means of the prism lens sheets 111, 121 and hence, the provision of only lens sheets 301, 303 which perform converging actions in the Z-axis direction are sufficient as the prism lens sheets to be mounted on the front faces of the optical sensor arrays 110, 120.

Lenticular lens sheets may be mounted in place of the prism lens sheets 301, 302, 303 and 304.

Third Embodiment

This embodiment relates to a display device equipped with the touch panel of the first or second embodiment.

Figure 5:
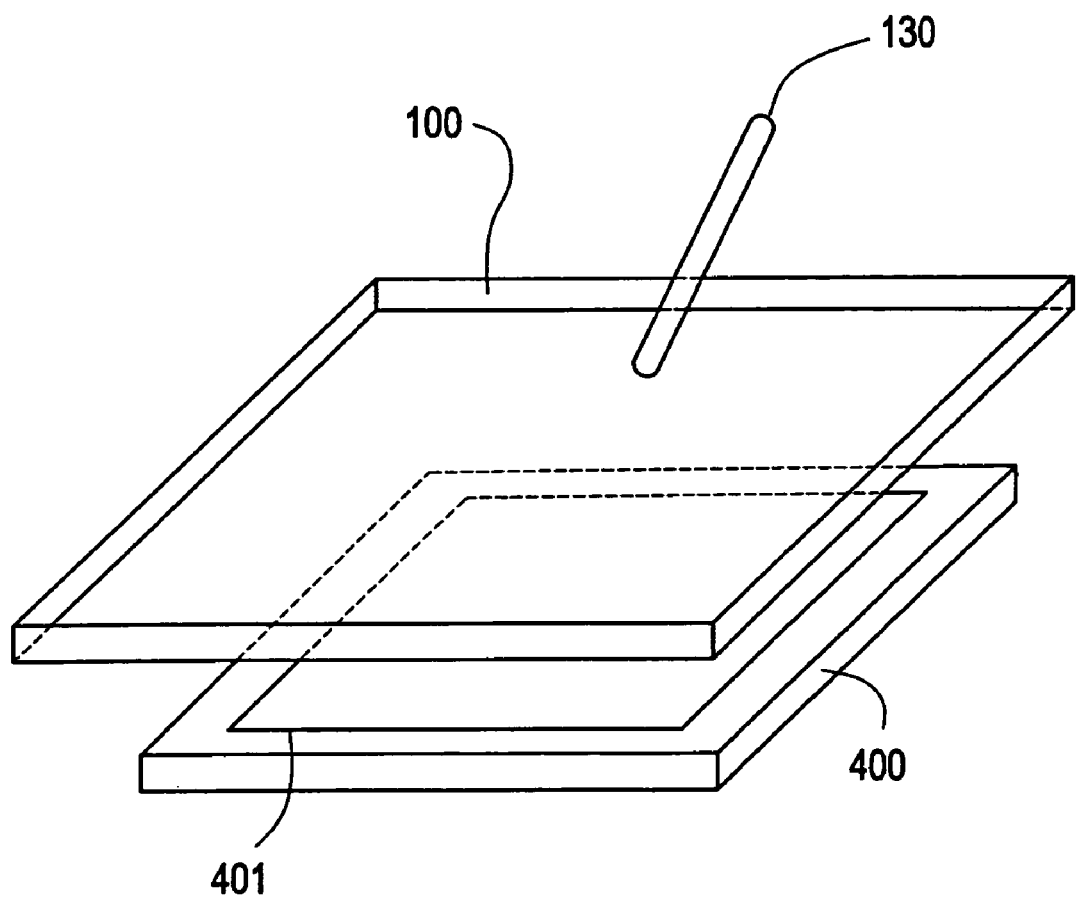
FIG. 5 is a schematic view of a liquid crystal display device equipped with the touch panel of this invention.

As shown in FIG. 5, the touch panel 100 of this invention is used in such a manner that it is mounted in front of a display screen of a display device such as a crystal display device 400. Since the light guide panel 101 is made of translucent material, the display screen 401 can be seen by way of the light guide panel 101. When one inputs a character or a picture to the touch panel 100 using the input pen 130 while watching the display screen 401, the screen of the crystal display device is changed corresponding to the change of the position of the input pen 130. When inputting is made using the input pen 130 or the fingertip, substantially no deformation occurs on the light guide panel 101 and hence, no physical force is applied to the screen of the crystal display device below the touch panel.

It is needless to say that as the display device of this embodiment, other flat-type display devices such as a plasma display device, an electro-luminescence (EL) display device, another flat type display device or a cathode-ray tube (CRT) can be used.

Furthermore, the touch panel of this invention can be used as a tablet without being combined with the display device.

Fourth Embodiment

This Embodiment demonstrates a process for producing an electro-luminescence (EL) display device combined with the touch panel of this invention.

Figure 6A:
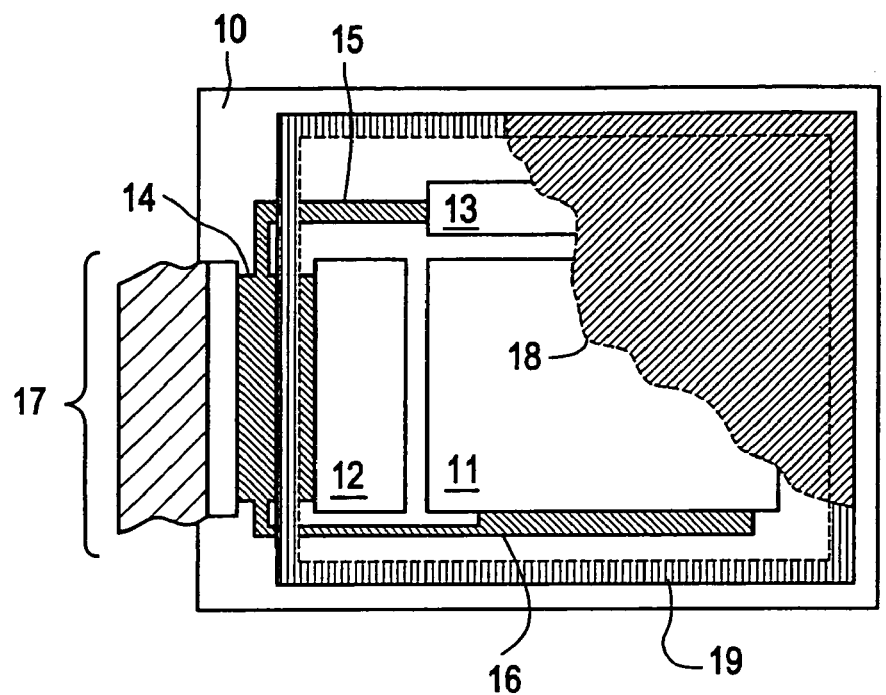
FIGS. 6A and 6B include a top view and a cross-sectional view of an electro-luminescence display device.

FIG. 6A is a top view showing the EL display device. In FIG. 6A, there are shown a substrate 10, a pixel part 11, a source driving circuit 12, and a gate driving circuit 13, each driving circuit connecting to wirings 14, 15, 16 which reach a flexible printed circuit (FPC) 17 leading to external equipment.

The pixel part, preferably together with the driving circuit, is enclosed by a sealing material (or housing material) 18. The sealing material 18 may be a concave metal plate or glass plate which encloses the element; alternatively, it may be an ultraviolet curable resin. A concave metal plate should be fixed to the substrate 10 with an adhesive 19 so that an airtight space is formed between the metal plate and the substrate 10. Thus, the EL element is completely sealed in the airtight space and completely isolated from the outside air.

It is desirable that the cavity 20 between the sealing material 18 and the substrate 10 be filled with an inert gas (such as argon, helium, and nitrogen) or a desiccant (such as barium oxide), so as to protect the EL element from degradation by moisture.

Figure 6B:
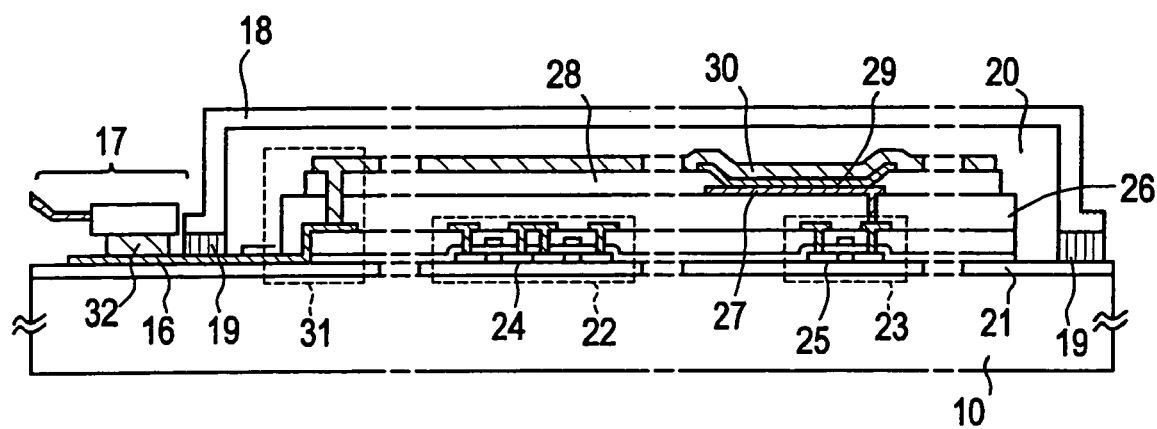

FIG. 6B is a sectional view showing the structure of the EL display device in this Embodiment. There is shown a substrate 10, an underlying coating 21, a thin film transistor (TFT) 22 for the driving circuit, and a TFT 23 for the pixel unit. The TFT 22 shown is a CMOS circuit consisting of an n-channel type TFT and a p-channel type TFT. The TFT 23 shown is the one which controls current to the EL element. These TFTs may be of any known structure (top gate structure or bottom gate structure).

Upon completion of TFT 22 for the driving circuit and TFT 23 for the pixel unit, a pixel electrode 27 is formed on the interlayer insulating film (planarizing film) 26 made of a resin. This pixel electrode is a transparent conductive film which is electrically connected to the drain of TFT 23 for the pixel unit. The transparent conductive film may be formed from a compound (called ITO) of indium oxide and tin oxide or a compound of indium oxide and zinc oxide. On the pixel electrode 27 is formed an insulating film 28, in which is formed an opening above the pixel electrode 27.

Subsequently, the EL layer 29 is formed. It may be of single-layer structure or multi-layer structure by freely combining known EL materials such as injection layer, hole transport layer, light emitting layer, electron transport layer, and electron injection layer. Any known technology may be available for such structure. The EL material is either a low-molecular material or a high-molecular material (polymer). The former may be applied by vapor deposition, and the latter may be applied by a simple method such as spin coating, printing, or ink-jet method.

In this example, the EL layer is formed by vapor deposition through a shadow mask. The resulting EL layer permits each pixel to emit light differing in wavelength (red, green, and blue). This realizes the color display. Alternative systems available include the combination of color conversion layer (CCM) and color filter and the combination of white light emitting layer and color filter. Needless to say, the EL display device may be monochromatic.

On the EL layer is formed a cathode 30. Prior to this step, it is desirable to clear moisture and oxygen as much as possible from the interface between the EL layer 29 and the cathode 30. This object may be achieved by forming the EL layer 29 and the cathode 30 consecutively in a vacuum, or by forming the EL layer 29 in an inert atmosphere and then forming the cathode 30 in the same atmosphere without admitting air into it. In this Embodiment, the desired film was formed by using a film-forming apparatus of multi-chamber system (cluster tool system).

The multi-layer structure composed of lithium fluoride (LiF) film and aluminum film is used in this Example as the cathode 30. To be concrete, the EL layer 29 is coated by vapor deposition with a lithium fluoride film (1 nm thick) and an aluminum film (300 nm thick) sequentially. Needless to say, the cathode 30 may be formed from MgAg electrode which is a known cathode material. Subsequently, the cathode 30 is connected to a wiring 16 in the region indicated by 31. The wiring 16 to supply a prescribed voltage to the cathode 30 is connected to the FPC 17 through an electrically conductive paste material 32.

The electrical connection between the cathode 30 and the wiring 16 in the region 31 needs contact holes in the interlayer insulating film 26 and the insulating film 28. These contact holes may be formed when the interlayer insulating film 26 undergoes etching to form the contact hole for the pixel electrode or when the insulating film 28 undergoes etching to form the opening before the EL layer is formed. When the insulating film 28 undergoes etching, the interlayer insulating film 26 may be etched simultaneously. Contact holes of good shape may be formed if the interlayer insulating film 26 and the insulating film 28 are made of the same material.

The wiring 16 is electrically connected to the FPC 17 through the gap (filled with an adhesive 19) between the sealing material 18 and the substrate 10. As in the wiring 16 explained above, other wirings 14 and 15 are also electrically connected to the FPC 17 under the sealing material 18.

The above-mentioned EL display device can be used as a display device combined with the touch panel of this invention.

Fifth Embodiment

Figure 7A:
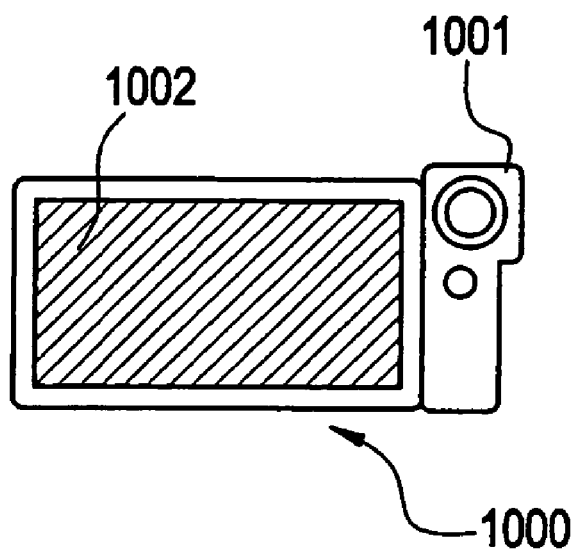
FIGS. 7A and 7B are explanatory views of information terminals mounting the touch panel of this invention.
Figure 7B:
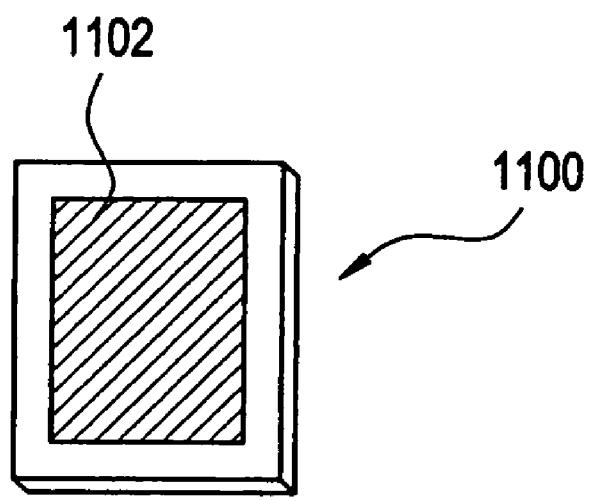
Figure 8A:
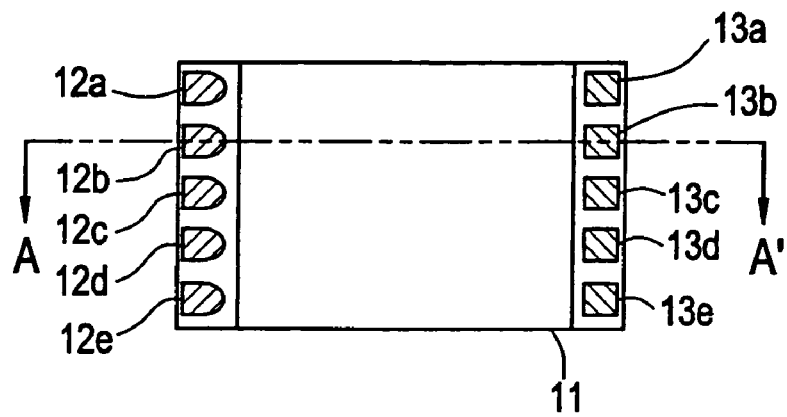
FIGS. 8A and 8B are explanatory views of a conventional touch panel.
Figure 8B:
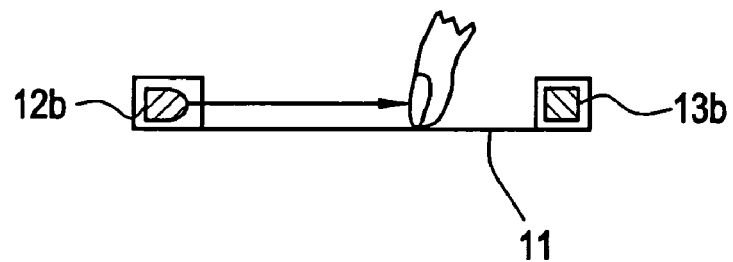
Figure 9:
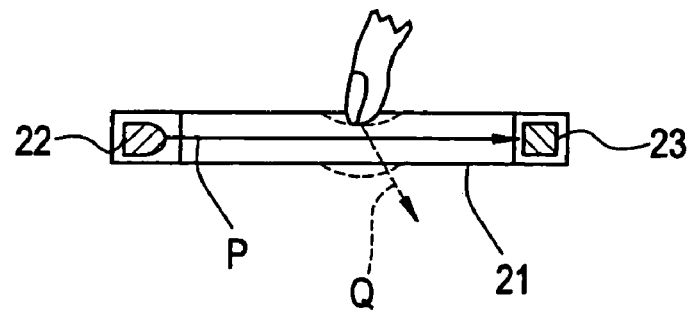
FIG. 9 is an explanatory view of a conventional touch panel.

This embodiment of the invention is explained in conjunction with FIGS. 7A and 7B. This embodiment relates to an example in which this invention is applied to an electronic appliance which mounts the liquid crystal display device equipped with the touch panel shown in FIG. 5. FIGS. 7A and 7B show information terminal equipments having no keyboard.

FIG. 7A shows an information terminal equipment 1000 provided with a www browse function or a communication function such as an electronic mail. A digital camera 1001 is mounted on the terminal equipment 1000 and a liquid crystal display device 1002 equipped with a touch panel is used as a screen. The liquid crystal display device can be replaced by an EL display device.

FIG. 7B shows an electronic notebook 1100 provided with a communication function. A liquid crystal display device 1102 equipped with a touch panel is used as a screen. The liquid crystal display device can be replaced by an EL display device.

The input face of the touch panel of this invention is made of the light guide panel so that touch panel has an extremely simple construction and can withstand a physical impact. Accordingly, the touch panel can be preferably used in a portable type information terminal equipment as shown in FIGS. 7A and 7B.

Furthermore, in addition to the information terminal equipment shown in FIGS. 7A and 7B, the touch panel of this invention is also applicable to all kinds of electronic appliances such as a ticket vending machine, an automatic cash payment machine (ATM), an office automation appliance such as a facsimile or a copying machine or the like.

As has been described heretofore, the touch panel of this invention has no electric wiring at the input portion and hence, the touch panel can withstand an impact. Furthermore, since the illuminating light emitted from the illumination device enters the light guide panel after being turned into light having a high directivity by the lens sheet, the input position can be detected with a high accuracy.

What is claimed is:
1. An electroluminescence display device comprising:
  a light guide panel comprising a first light transmitting material over a display screen of said electroluminescence display device;
  a plurality of optical sensors opposed to a first side face of said light guide panel, said plurality of optical sensors having a light receiving face thereof opposed to a first side face;
  a lens sheet having a light emitting face thereof opposed to a second side face of said light guide panel which is opposed to said first side face; and a light source for illuminating an incident light face of said lens sheet, said light source opposed to said second side face of said light guide panel, wherein said lens sheet is provided between said first side face of said light guide panel and said light source.

2. The electroluminescence display device according to claim 1, wherein a refractive index of said first light transmitting material is 1.4 to 1.7.

3. The electroluminescence display device according to claim 1, wherein said first light transmitting material comprises a translucent material.

4. The electroluminescence display device according to claim 1, wherein said light emitting face of said lens sheet has a plurality of prismatic or semicylindrical protrusions.

5. The electroluminescence display device according to claim 1, wherein said light source comprises light emitting diodes.

6. The electroluminescence display device according to claim 1, wherein said electroluminescence display device is equipped with an input pen which is brought into contact with a surface of said light guide panel, and a contact portion of said input pen with said light guide panel comprises a second light transmitting material of which the refractive index is equal to or greater than that of said first light transmitting material.

7. The electroluminescence display device according to claim 1, wherein said electroluminescence display device is equipped with an input pen which is brought into contact with a surface of said light guide panel, and a tail end portion of said input pen comprises a material which absorbs illuminating light from said light source.

8. An electronic appliance comprising the electroluminescence display device according to claim 1, wherein said electronic appliance is selected from the group consisting of an information terminal equipment and an electronic note book.

9. An electroluminescence display device comprising:
a light guide panel comprising a first light transmitting material over a display screen of said electroluminescence display device;
a first optical sensor array opposed to a first side face of said light guide panel;
a second optical sensor array opposed to a second side face of said light guide panel;
a first lens sheet opposed to a third side face of said light guide panel;
a second lens sheet opposed to a fourth side face of said light guide panel;
a first light source opposed to said third side face of said light guide panel; and
a second light source opposed to said fourth side face of said light guide panel,
wherein said first side face is opposed to said third side face, and said second side face is opposed to said fourth side face, and
wherein said first lens sheet is provided between said first side face of said light guide panel and said first light source, and said second lens sheet is provided between said second side face of said light guide panel and said second light source.

10. The electroluminescence display device according to claim 9, wherein a refractive index of said first light transmitting material is 1.4 to 1.7.

11. The electroluminescence display device according to claim 9, wherein said first light transmitting material comprises a translucent material.

12. The electroluminescence display device according to claim 9, wherein said light emitting face of said lens sheet has a plurality of prismatic and semicylindrical protrusions.

13. The electroluminescence display device according to claim 9, wherein said light source comprises light emitting diodes.

14. The electroluminescence display device according to claim 9, wherein said electroluminescence display device is equipped with an input pen which is brought into contact with a surface of said light guide panel, and a contact portion of said input pen with said light guide panel comprises a second light transmitting material of which the refractive index is equal to or greater than that of said first light transmitting material.

15. The electroluminescence display device according to claim 9, wherein said electroluminescence display device is equipped with an input pen which is brought into contact with a surface of said light guide panel, and a tail end portion of said input pen comprises a material which absorbs illuminating light from said light source.

16. An electronic appliance comprising the electroluminescence display device according to claim 9, wherein said electronic appliance is selected from the group consisting of an information terminal equipment and an electronic note book.

17. An electroluminescence display device comprising:
a light guide panel comprising a first light transmitting material over a display screen of said electroluminescence display device;
a plurality of optical sensors opposed to a first side face of said light guide panel;
a lens sheet opposed to a second side face of said light guide panel which is opposed to said first side face; and
a light source opposed to said second side face of said light guide panel,
wherein said lens sheet is provided between said first side face of said light guide panel and said light source, and
wherein said plurality of optical sensors are closely provided in said second side face of said light guide panel.

18. The electroluminescence display device according to claim 17, wherein a refractive index of said first light transmitting material is 1.4 to 1.7.

19. The electroluminescence display device according to claim 17, wherein said first light transmitting material comprises a translucent material.

20. The electroluminescence display device according to claim 17, wherein said light emitting face of said lens sheet has a plurality of prismatic or semicylindrical protrusions.

21. The electroluminescence display device according to claim 17, wherein said light source comprises light emitting diodes.

22. The electroluminescence display device according to claim 17, wherein said electroluminescence display device is equipped with an input pen which is brought into contact with a surface of said light guide panel, and a contact portion of said input pen with said light guide panel comprises a second light transmitting material of which the refractive index is equal to or greater than that of said first light transmitting material.

23. The electroluminescence display device according to claim 17, wherein said electroluminescence display device is equipped with an input pen which is brought into contact with a surface of said light guide panel, and a tail end portion of said input pen comprises a material which absorbs illuminating light from said light source.

24. An electronic appliance comprising an electroluminescence display device according to claim 17, wherein said electronic appliance is selected from the group consisting of an information terminal equipment and an electronic note book.

25. An electroluminescence display device comprising:
a light guide panel comprising a first light transmitting material over a display screen of said electroluminescence display device;
an optical sensor array having a light receiving face thereof opposed to a first side face of said light guide panel;
a lens sheet having a light emitting face thereof opposed to a second side face of said light guide panel which is opposed to said first side face; and
a light source for illuminating an incident light face of said lens sheet,
wherein triangular pole shaped protrusions or semicylindrical shaped protrusions are continuously formed at said light emitting face of said lens sheet.

26. The electroluminescence display device according to claim 25, wherein a refractive index of said first light transmitting material is 1.4 to 1.7.

27. The electroluminescence display device according to claim 25, wherein said first light transmitting material comprises a translucent material.

28. The electroluminescence display device according to claim 25, wherein said light source comprises light emitting diodes.

29. The electroluminescence display device according to claim 25, wherein said electroluminescence display device is equipped with an input pen which is brought into contact with a surface of said light guide panel, and a contact portion of said input pen with said light guide panel comprises a second light transmitting material of which the refractive index is equal to or greater than that of said first light transmitting material.

30. The electroluminescence display device according to claim 25, wherein said electroluminescence display device is equipped with an input pen which is brought into contact with a surface of said light guide panel, and a tail end portion of said input pen comprises a material which absorbs illuminating light from said light source.

31. An electronic appliance comprising the electroluminescence display device according to claim 25, wherein said electronic appliance is selected from the group consisting of an information terminal equipment and an electronic note book.

32. An electroluminescence display device comprising:
a light guide panel comprising a first light transmitting material over a display screen of the electroluminescence display device;
an optical sensor array having a light receiving face thereof opposed to a first side face of said light guide panel;
a first lens sheet having a light emitting face thereof opposed to a second side face of said light guide panel which is opposed to said first side face;
a second lens sheet having a light emitting face thereof opposed to said first side face;
a light source for illuminating an incident of light face of said first lens sheet;
wherein said first lens sheet is provided between said first side face of said light guide panel and said light source, and said second lens sheet is provided between said second side face of said light guide panel and said optical sensor array.

33. The electroluminescence display device according to claim 32, wherein a refractive index of said first light transmitting material is 1.4 to 1.7.

34. The electroluminescence display device according to claim 32, wherein said first light transmitting material comprises a translucent material.

35. The electroluminescence display device according to claim 32, wherein said light emitting face of said lens sheet has a plurality of prismatic or semicylindrical protrusions.

36. The electroluminescence display device according to claim 32, wherein said light source comprises light emitting diodes.

37. The electroluminescence display device according to claim 32, wherein said electroluminescence display device is equipped with an input pen which is brought into contact with a surface of said light guide panel, and a contact portion of said input pen with said light guide panel comprises a second light transmitting material of which the refractive index is equal to or greater than that of said first light transmitting material.

38. The electroluminescence display device according to claim 32, wherein said electroluminescence display device is equipped with an input pen which is brought into contact with a surface of said light guide panel, and a tail end portion of said input pen comprises a material which absorbs illuminating light from said light source.

39. An electronic appliance comprising the electroluminescence display device according to claim 32, wherein said electronic appliance is selected from the group consisting of an information terminal equipment and an electronic note book.

40. An electroluminescence display device comprising:
a light guide panel comprising a first light transmitting material over a display screen of the electroluminescence display device;
a first optical sensor array opposed to a first side face of said light guide panel;
a second optical sensor array opposed to a second side face of said light guide panel;
a first lens sheet opposed to a first side face of said light guide panel;
a second lens sheet opposed to a second side face of said light guide panel;
a third lens sheet opposed to a third side face of said light guide panel
a fourth lens sheet opposed to a fourth side face of said light guide panel;
a first light source opposed to said third side face of said light guide panel; and
a second light source opposed to said fourth side face of said light guide panel,
wherein said first side face is opposed to said third side face, and said second side face is opposed to said fourth side face, and
wherein said first lens sheet is provided between said third side face of said light guide panel and said first optical sensor array, and second lens sheet is provided between said fourth side face of said light guide panel and said second optical sensor array, and
wherein said third lens sheet is provided between said first side face of said light guide panel and said first light source, and said fourth lens sheet is provided between said second side face of said light guide panel and said second light source.

41. The electroluminescence display device according to claim 40, wherein a refractive index of said first light transmitting material is 1.4 to 1.7.

42. The electroluminescence display device according to claim 40, wherein said first light transmitting material comprises a translucent material.

43. The electroluminescence display device according to claim 40, wherein said light emitting face of said lens sheet has a plurality of prismatic or semicylindrical protrusions.

44. The electroluminescence display device according to claim 40, wherein said light source comprises light emitting diodes.

45. The electroluminescence display device according to claim 40, wherein said electroluminescence display device is equipped with an input pen which is brought into contact with a surface of said light guide panel, and a contact portion of said input pen with said light guide panel comprises a second light transmitting material of which the refractive index is equal to or greater than that of said first light transmitting material.

46. The electroluminescence display device according to claim 40, wherein said electroluminescence display device is equipped with an input pen which is brought into contact with a surface of said light guide panel, and a tail end portion of said input pen comprises a material which absorbs illuminating light from said light source.

47. An electronic appliance comprising the electroluminescence display device according to claim 40, wherein said electronic appliance is selected from the group consisting of an information terminal equipment and an electronic note book.

* * * * *